Feb. 17, 1953          R. E. REEVE          2,628,589

MILK TRANSFER UNIT FOR AUTOMATIC MILKING MACHINES

Filed Feb. 24, 1951          2 SHEETS—SHEET 1

INVENTOR
Robert E. Reeve

BY *[signature]*
ATTORNEYS

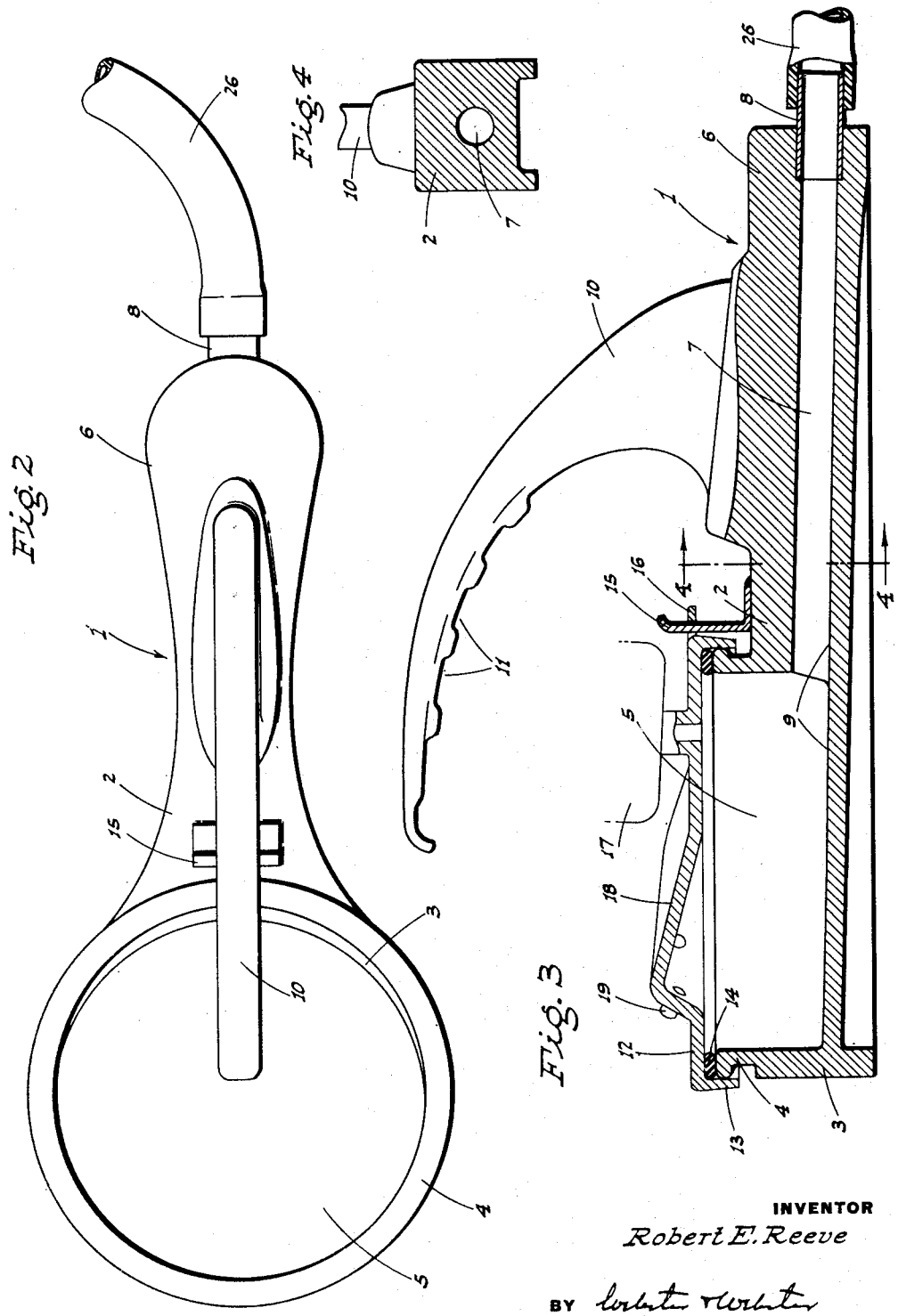

Patented Feb. 17, 1953

2,628,589

UNITED STATES PATENT OFFICE 2,628,589

MILK TRANSFER UNIT FOR AUTOMATIC MILKING MACHINES

Robert E. Reeve, Tracy, Calif.

Application February 24, 1951, Serial No. 212,542

2 Claims. (Cl. 119—14.54)

1

This invention relates generally to an improvement in automatic, vacuum actuated milking machines.

In one type of automatic milking machine a pail is suspended, above floor, by a sling extending over the body of the cow; the purpose of such suspension being to impart a weight or pull on the teat cup assembly, as is desirable to maintain the teat cups in proper position and to accomplish more effective milking than otherwise. A disadvantage of the above pail-type, automatic milking machine is that the pail must be manually emptied each time it fills, and constant attention is required to prevent over-filling.

In another type of automatic, vacuum actuated milking machine the milk flows from the teat cup assembly to a transfer unit, and from the latter delivers to a hose connected to a milk pipe feeding the milk under vacuum to a central processing station. Heretofore, in this latter or pipe-line type, automatic milking machine the milk transfer unit between the teat cup assembly and the milk hose was constructed in a manner such that it did not have the advantages of a pail, as in the pail-type milking machine; to-wit, the advantage of substantial weight to impart the desirable pull on the teat cup assembly.

It is therefore a major object of the present invention to provide, in an automatic milking machine of the pipe-line type, a milk transfer unit which is small and compact, yet provides the necessary weight and nicety of balance with respect to the teat cup assembly as does the pail in a pail-type milking machine; but does not act as a reservoir for any appreciable amount of milk, and thus weight change is nominal, and the balance of the unit is undisturbed over the period of use.

Another important object of the invention is to provide a milk transfer unit, as above, which comprises a shallow but relatively heavy body having novel passage means therein arranged to connect between the teat cup assembly and the milk hose which delivers to the milk pipe feeding the central processing station; said passage means being arranged so that the milk transfers in the unit by gravity, as well as under the influence of vacuum.

An additional object of the present invention is to provide a milk transfer unit, for the purpose described, which is designed for ease and economy of manufacture; the device being simple but sturdy in structure, and convenient to use.

These objects are accomplished by means of

2 such structure and relative arrangement of parts as will fully appear by a perusal of the following specification and claims.

In the drawings:

Fig. 2 is an enlarged top plan view of the milk transfer unit with the circular lid or cover detached.

Fig. 3 is an enlarged longitudinal sectional elevation of the milk transfer unit.

Fig. 4 is a transverse section on line 4—4 of Fig. 3.

Figure 1:
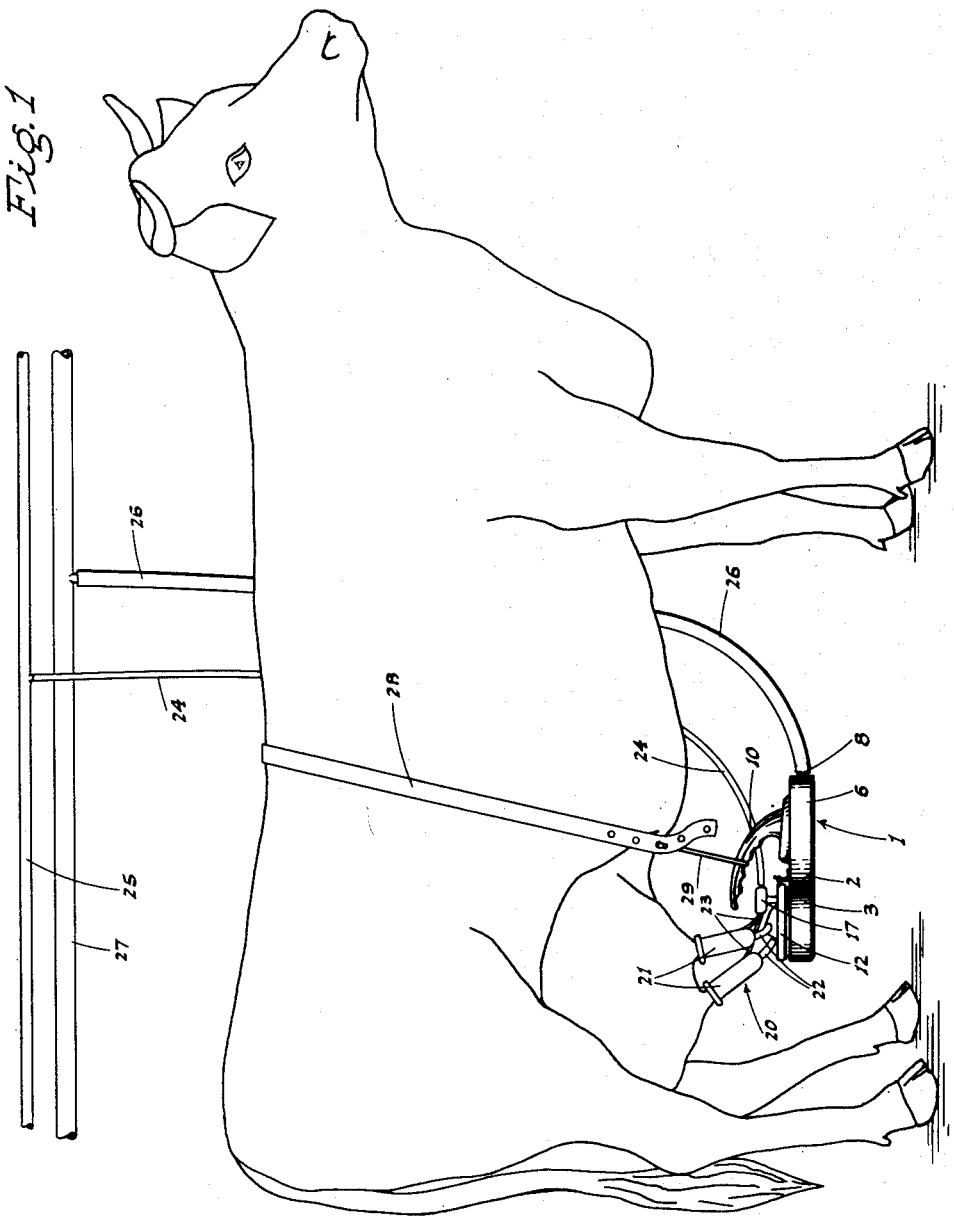
Fig. 1 is a side elevation of the milk transfer unit as in use.

Referring now more particularly to the characters of reference on the drawings, the milk transfer unit is indicated generally at 1 and comprises a one-piece, quite heavy body 2 which is "banjo" shaped in plan but relatively thin or shallow in elevation.

At its rear end portion the body 2 is circular, as at 3, and includes a relatively short upstanding neck 4; such neck and the adjacent portion of the body surrounding a relatively shallow milk transfer chamber 5.

The elongated front end portion 6 of the body 2 is formed with an internal longitudinal milk transfer passage 7 which extends from the chamber 5 to the front end of said body, there communicating with a fitting 8. The floor 9 of the chamber 5 and passage 7 slopes forwardly and downwardly for its full length, whereby when the milk transfer unit 1 is in a horizontal position, milk delivered to the chamber 5 will tend to flow by gravity to the fitting 8.

The front end portion 6 of the body 2 is fitted with a rearwardly arched handle 10 which extends upwardly and rearwardly to a termination substantially centrally above the chamber 5, and such handle is formed, on the under side, with a row of notches 11, for the purpose which will hereinafter appear.

The neck 4 supports a removable, circular lid or cover 12 which includes a dependent peripheral flange 13 which extends about the neck 4 exteriorly thereof, and an annular sealing gasket 14 is engaged between said cover 12 and said neck.

A locator finger 15 upstands from the body 2 directly ahead of the neck 4, and projects in locating relation through a fork 16 on the front of the cover 12. The cover 12 supports, and is in communication with, a conventional pulsator 17, while rearwardly of said pulsator said cover is domed, as at 18, with fittings 19 opening into said domed portion.

The teat cup assembly is indicated generally at 20 and includes teat cups 21 having relatively short hoses 22 which lead to connection with corresponding fittings 19. Also, vacuum tubes 23 lead from the teat cups 21 to the pulsator 17; the latter being in turn connected to a vacuum hose 24 coupled to the main vacuum pipe 25 of the milking machine.

The fitting 8 at the front of the body 2 is connected to a milk hose 26 which leads from the milk transfer unit 1 to connection with the main milk pipe 27; the latter delivering to the central processing station.

When the described milk transfer unit is in use, it is suspended beneath the belly of the cow in the manner shown in Fig. 1; there being a back strap or sling 28 extending over the cow's body, and an inverted bail 29 extends beneath the body and adjustably connects with said sling, as shown. The handle 10 is engaged over the inverted bail 29, and the latter seats in the one of the notches 11 which provides the best balance of the milk transfer unit 1, while maintaining the desired downward pull through the hoses 22 on the teat cups 21; it being preferable that such unit be balanced in horizontal position.

As so suspended and balanced, the unit 1 serves to receive the milk, from the teat cup assembly 20, in the chamber 5, and to thence continually transfer such milk from said chamber through the passage 7 and end fitting 8 into the milk hose 26. Such continuous transfer assures that there is no substantial weight added to the unit 1 during operation thereof, so that its position or balance is not affected; the body 1, being in itself relatively heavy, providing the necessary stability of the unit 1 and pull on the teat cup hoses 22 and teat cups 21.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A milk transfer unit adapted to be suspended beneath a cow and arranged for connection to the mounting cover of a teat cup assembly, said unit comprising a relatively heavy elongated body which includes a flat-bottomed shallow chamber at one end to receive the cover in releasable sealing relation, and a relatively solid portion beyond the chamber; and a handle upstanding from and rigid with said body portion and overhanging the chamber for longitudinally swingable supporting engagement with a cow supported suspension element; said body portion having a passage therethrough leading from the chamber to the outer end of said portion for connection to a milk hose.

2. A unit, as in claim 1, in which the weight distribution of the body as a whole is such that the portion of the body beyond the chamber substantially balances the chamber and the weight of the teat cup assembly supported thereon so that the unit when suspended from a cow is maintained in a generally horizontal position.

ROBERT E. REEVE.

REFERENCES CITED

The following references are of record in the file of this patent:

UNITED STATES PATENTS

| Number | Name | Date |
| --- | --- | --- |
| 878,058 | Groff | Feb. 4, 1908 |
| 967,513 | Groff | Aug. 16, 1910 |
| 1,210,468 | Harner | Jan. 2, 1917 |
| 1,583,580 | Dinesen | May 4, 1926 |
| 1,653,756 | Babson | Dec. 27, 1927 |
| 1,859,213 | McCornack | May 17, 1932 |
| 2,412,197 | Babson | Dec. 10, 1946 |
| 2,518,589 | Anderson | Aug. 15, 1950 |